United States Patent
Pandey (10) Patent No.: US 9,864,042 B2
(45) Date of Patent: Jan. 9, 2018

(54) OPTIMIZING STORAGE AND USAGE OF ANGLE-OF-ARRIVAL HEATMAPS

(71) Applicant: Cisco Technology, Inc., San Jose, CA (US)

(72) Inventor: Santosh Pandey, Newark, CA (US)

(73) Assignee: Cisco Technology, Inc., San Jose, CA (US)

( * ) Notice: Subject to any disclaimer, the term of this patent is extended or adjusted under 35 U.S.C. 154(b) by 411 days.

(21) Appl. No.: 14/722,712

(22) Filed: May 27, 2015

(65) Prior Publication Data

US 2016/0349348 A1    Dec. 1, 2016

(51) Int. Cl.
*G01S 5/04* (2006.01)
*G01S 3/02* (2006.01)
*G01S 5/02* (2010.01)
*G01S 5/06* (2006.01)
*G01S 3/04* (2006.01)

(52) U.S. Cl.
CPC ............ *G01S 5/0252* (2013.01); *G01S 3/043* (2013.01); *G01S 5/06* (2013.01)

(58) Field of Classification Search
CPC .................................. G01S 3/48; G01S 5/0252
USPC .................... 342/357.2, 437, 442, 445, 451; 455/456.3, 457
See application file for complete search history.

(56) References Cited

U.S. PATENT DOCUMENTS

| | | | |
|---|---|---|---|
| 6,437,737 B1 | 8/2002 | Azzarelli et al. | |
| 6,614,859 B2 | 9/2003 | Lay | |
| 8,811,189 B2 | 8/2014 | Pandey et al. | |
| 2013/0342565 A1* | 12/2013 | Sridhara | G01C 21/206 345/629 |
| 2014/0327579 A1 | 11/2014 | Hart et al. | |
| 2015/0341233 A1* | 11/2015 | Marri Sridhar | G01S 5/0252 370/252 |
| 2016/0187457 A1* | 6/2016 | Chen | G01S 5/0252 342/451 |

* cited by examiner

*Primary Examiner* — Dao Phan
(74) *Attorney, Agent, or Firm* — Edell, Shapiro & Finan, LLC (57) ABSTRACT

Heatmap data, such as Angle-of-Arrival heatmap data, is generated and stored for a plurality of antennas of wireless communication device. A centroid of the plurality of antennas is determined. A heatmap is computed for the centroid for a measured parameter across a plurality of bins at coordinates within a region of interest. Heatmap data for the centroid is stored. For a given one of the plurality of antennas, a difference is computed between a heatmap for the given antenna and the heatmap for the centroid. The difference data representing the difference is stored for the given antenna.

20 Claims, 8 Drawing Sheets

OPTIMIZING STORAGE AND USAGE OF ANGLE-OF-ARRIVAL HEATMAPS

TECHNICAL FIELD

The present disclosure relates to wireless communication systems and devices.

BACKGROUND

In wireless communication systems, Angle-of-Arrival (AoA) heatmaps are used to determine a location of a target wireless device based on signals received from the target wireless device at one or more fixed wireless devices. For example, in an IEEE 802.11 wireless location area network (WLAN), a wireless client device can be located based on signals received at multiple access points from the client device.

AoA heatmaps are very precise Euclidean distances from each antenna on the access point. Each antenna heatmap is represented by a predetermined number of bins in a two-dimensional array, where each bin represents a predetermined area, e.g., 2 by 2 square feet. When the access point has multiple antennas, which is often the case for location applications, the amount of data needed to be stored for all the antenna heatmaps can be substantial.

DESCRIPTION OF EXAMPLE EMBODIMENTS

Overview

In accordance with an example embodiment, a method is provided for generating and storing heatmap data for a plurality of antennas of wireless communication device. A centroid of the plurality of antennas is determined. A heatmap is computed for the centroid for a measured parameter across a plurality of bins at coordinates within a region of interest. Heatmap data for the centroid is stored. For a given one of the plurality of antennas, a difference is computed between a (very precise) heatmap for the given antenna and the (very precise) heatmap for the centroid. The difference data representing the difference is stored for the given antenna.

Example Embodiments

Presented herein are techniques to optimize the storage of heatmap data with limited processing penalty. A centroid of the antenna distribution is used to compute an extensive heatmap. For each of the antennas, only the difference between the centroid heatmap and the heatmap for that antenna is stored. Furthermore, the symmetric placement/configuration of the antennas may be exploited to further decrease the number of differential heatmap data to be stored.

A heatmap is an estimate of a measured parameter from which a device location can be determined. For example, the measured parameter may be receive signal strength, distance, or angle-of-arrival (phase) measurement of a signal at an antenna. The measured parameter is compared with the heatmap of the same parameter to compute a location probability.

Figure 1:
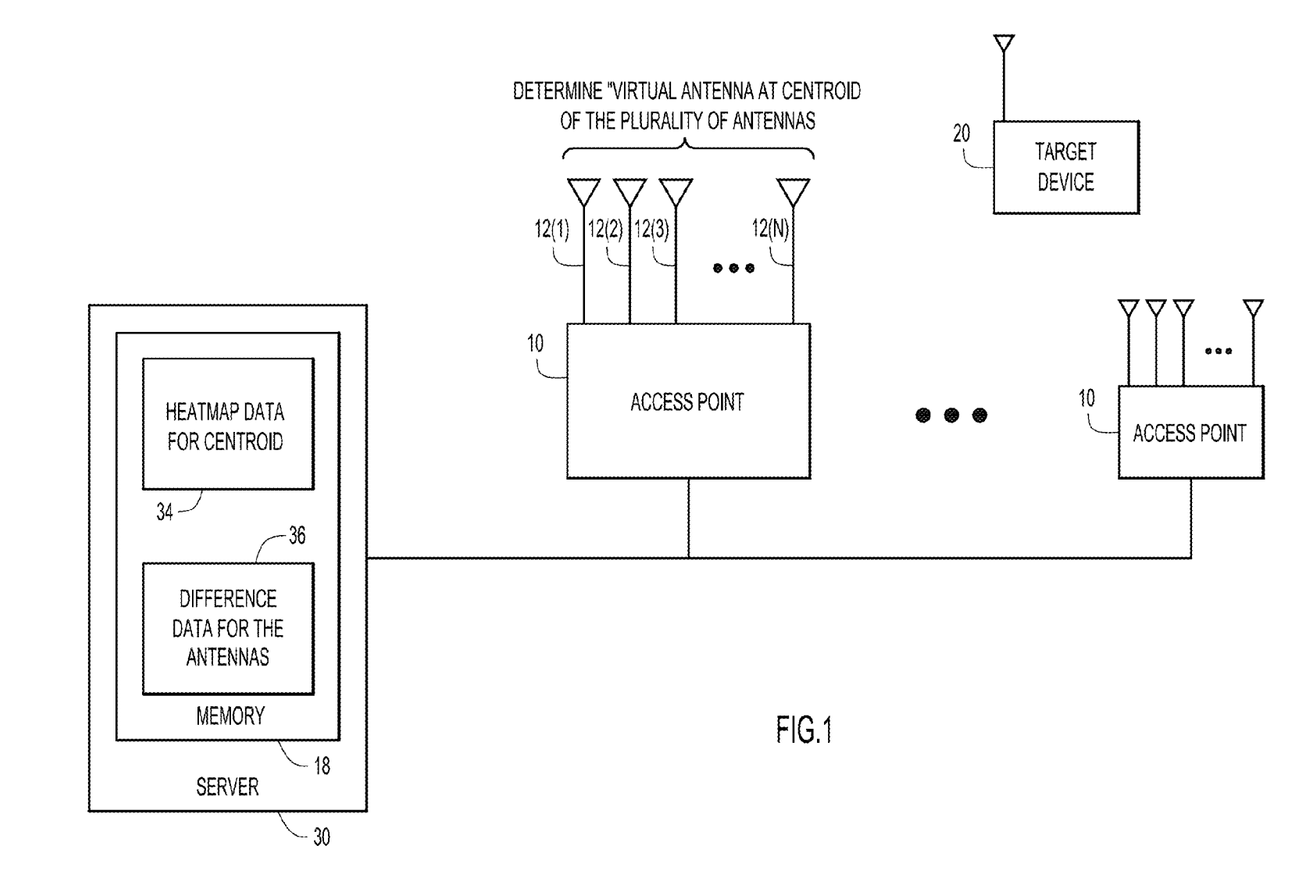
FIG. 1 is a system diagram illustrating a plurality of wireless access points configured to determine a location of a target device, wherein a reduced amount of heatmap data for each access point is stored, according to an example embodiment.

Reference is first made to FIG. 1. FIG. 1 illustrates a wireless device, e.g., a wireless local area network access point 10 having a plurality of antennas 12(1)-12(N). FIG. 1 shows a target wireless device 20 whose location is to be determined based on signals that the target device 20 transmits and which signals are received by the access point 10 and other nearby access points.

In a given wireless local area network deployment there are typically numerous access points 10, as shown in FIG. 1. A server 30 is connected by way of a local or wide area network to each of the access points. The server 30 may coordinate a location measurement session among a plurality of access points to determine the location of target device, e.g., target device 20. Moreover, there may be multiple server instances for some deployments.

In one example, an access point 10 has as many as 32 antennas used for performing angle-of-arrival (AoA) measurements for determining a location of an access point. Each antenna heatmap may comprise 801×801 bins. For an access point with 32 antennas, the amount of data needed to be stored that represents the heatmaps for all the antennas is 801*801*32(antennas)*8(byte double)=164 MB. As a comparison, receive signal strength information (RSSI) heatmaps are only 50 kB.

Moreover, there may be more than one heatmap associated with an access point, such as a course heatmap and fine heatmap, both of different bin sizes, in order optimize for faster location calculations. This further increases the amount of data needed to store an AoA heatmap for one AP.

In some network deployments, there may be thousands of access points. Some access points may have similar heatmaps, which need not be stored separately. However even if there are 1% unique heatmaps to store in a large wireless local area network deployment, AoA heatmaps will need 20*164 MB=3.2 GB of data. Since all heatmaps are loaded in cache of a server (or access point) for faster location computing, this can be a problem in an already memory constrained server or access point.

Accordingly, in order to reduce the amount of data needed to represent the AoA heatmaps associated with each access point antenna, a centroid of the plurality of antennas 12(1)-12(N) of the access point 10 is determined. This centroid is referred to as a "virtual" antenna. Heatmap data is generated and stored for the centroid or virtual antenna. Only difference data, representing the difference between the heatmap data for the centroid and the heatmap data for each antenna, is stored. Thus, as shown in FIG. 1, the server 30 includes memory 32 that stores heatmap data for the virtual antenna as shown at reference numeral 34 and difference data for the antennas 36. The difference data can be viewed as a difference heatmap.

Figure 2:
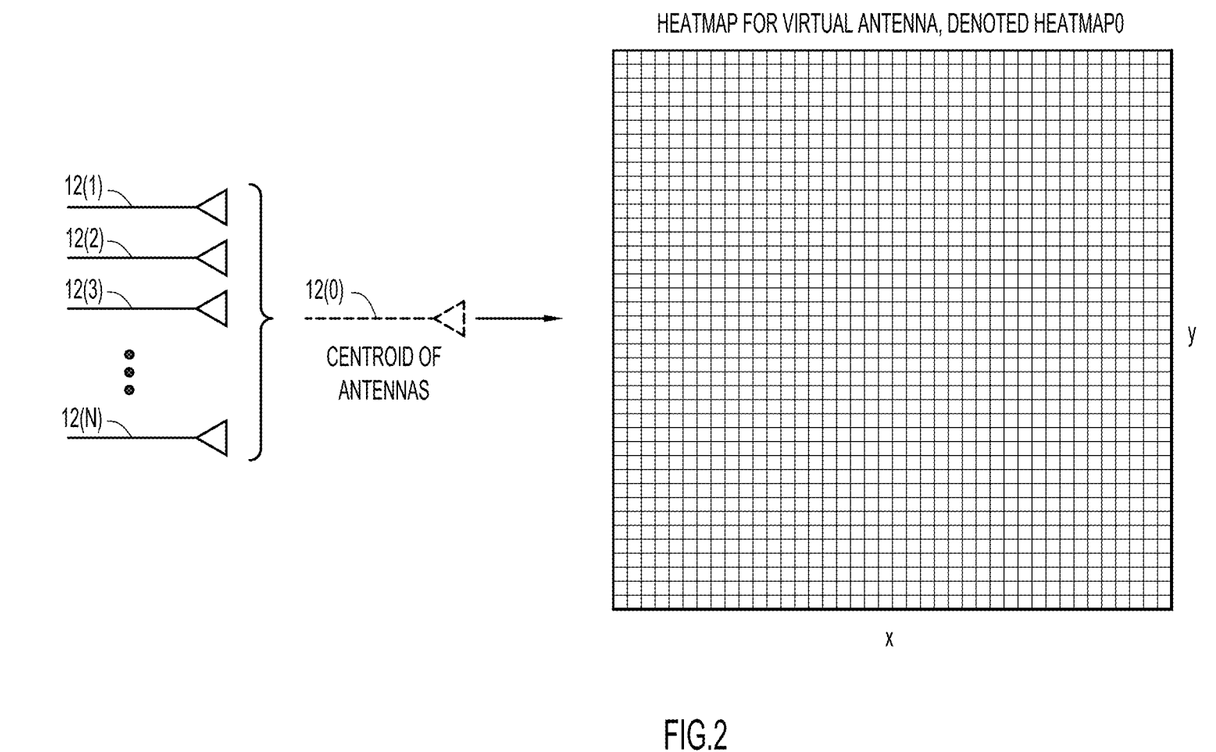
FIG. 2 is a diagram graphically depicting how a centroid is determined for a plurality of antennas on an access point, for use in reducing the amount of heatmap data needed to be stored for an access point, according to an example embodiment.

Reference is now made to FIG. 2. FIG. 2 shows the plurality of antennas 12(1)-12(N) of an access point. The antennas 12(1)-12(N) may have any of a variety of configurations, such as linear, circular, etc., and the arrangement shown in FIG. 2 is only a schematic/logical representation. Whatever the physical arrangement or configuration of the antennas, a centroid for the distribution for the plurality of antennas 12(1)-12(N) is determined. The centroid is then used to represent a point in space for a virtual antenna, and the centroid or virtual antenna is shown at reference numeral 12(0). Heatmap data for the virtual antenna is determined, as described below, and is denoted heatmap0. The heatmap data is an x by y grid of bins, each bin representing a cell of a predetermined area with respect to the antenna.

Optimization Scheme Generally

Figure 3:
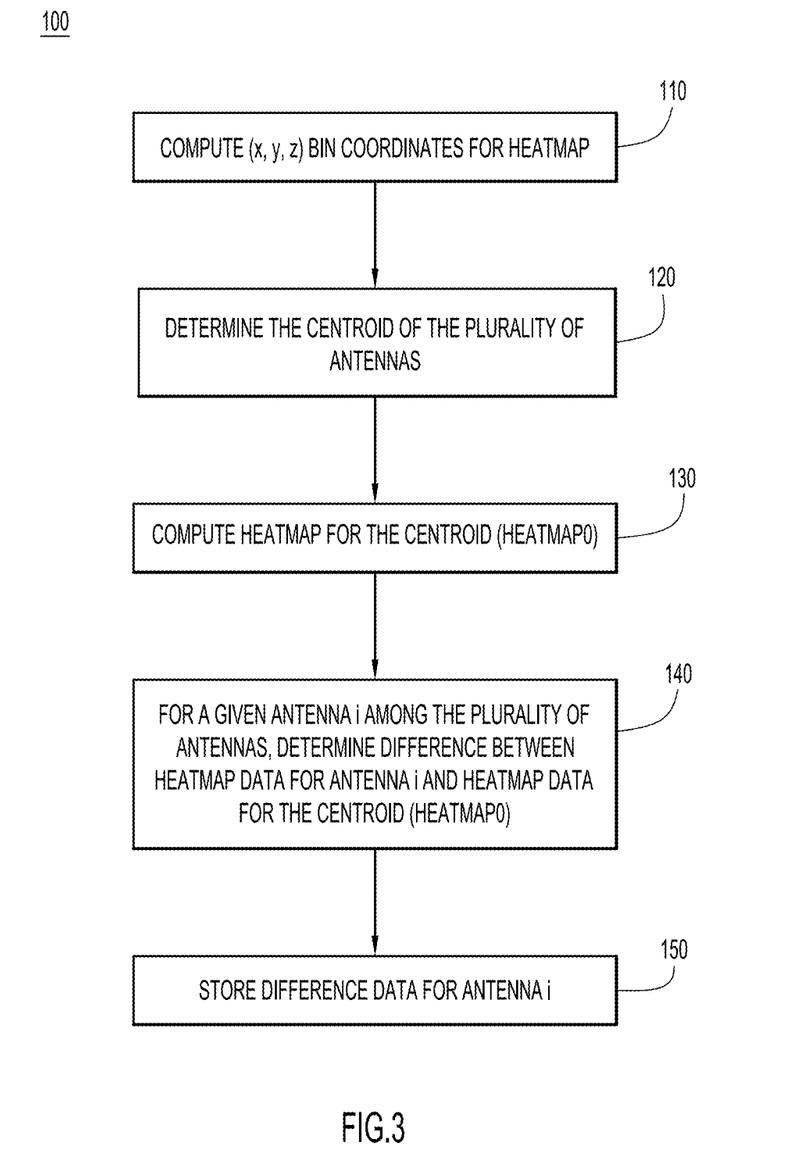
FIG. 3 is a flow chart of a method to generate and store a reduced amount of heatmap data for a plurality of antennas of an access point, according to an example embodiment.

Reference is now made to FIG. 3. FIG. 3 illustrates a flow chart of a method 100 for generating heatmap data for a plurality of antennas for storage and use in a location procedure. The order of the steps shown in FIG. 3 is not meant to be limiting. It is assumed for purposes of this description that the access point is at a position in space of (0,0,height). If the access point is at some other (x,y) position, the heatmap data is generated with the assumption of the access point being at (0,0) and the heatmap is shifted when computing location of a target device.

At 110, the (x,y,z) bin coordinates for the heatmap are computed. In one example, there is an odd numbered of x and y bins, i.e. 801×801.

At 120, the centroid of the antenna distribution for the plurality of antennas is computed. For a circular antenna array, the centroid is at the center of the access point (0,0,height). This is the location of the virtual antenna. Note that step 120 may be performed before step 110.

At 130, the heatmap0 for the centroid (virtual antenna) is computed as the distance from (0,0,height) to each of the bins. The heatmap for the centroid is stored.

Next, at 140, for a given antenna i among the plurality of antennas, the difference between heatmap data for antenna i and heatmap data for the centroid (heatmap0) is computed. The difference is represented by difference data, which as explained above, may be considered a difference heatmap.

At 150, the difference data for antenna i is stored.

The operations at step 140 may be as follows. The distance from the (x,y,z) coordinates of antenna i to the (x,y,z) bin coordinates is computed. This is currently what is called an AoA heatmap, and for purposes of this description, it is called heatmap_i.

Operation 150 may involve the following. The heatmap of antenna i is stored as heatmap_i_diff=int16((heatmap0−heatmap_i)*$10^4$). This is stored as 2 bytes per heatmap bin as opposed to what would be required with current techniques, 8 bytes. This is a "4-times" memory savings. To recover the heatmap for a given antenna i, the computation heat_i_reconst=heatmap0−double(heatmap_i_diff)/$10^4$ is performed.

The use of the difference data to represent the heatmap for a given antenna has little impact on heatmap accuracy. For example, for an access point having 32 antennas, the loss of accuracy is 1.0e-04*(−0.0002 −0.0002 −0.5000 0.5000), representing the (mean, median, minimum, maximum, respectively), i.e. a maximum of $5e^{-5}$ ft.

Further Optimization Due to Symmetry

When an access point has zero degree elevation placement (e.g., flat on a ceiling), which is large percentage of expected enterprise deployments, further optimization is possible. A check may be made for symmetry in the antenna configuration. For example, the distance of each antenna from (0,0,height) (called antennaDist) and an angle between each antenna is determined. A dot product or other computation may be made, such as calculating the angle of the antenna with respect to the x-axis (called antennaAngle). If there is any pair of antennas that have the same distance from (0,0, height) and their difference angle is 180 degrees, then it is not necessary to calculate the heatmap for both antennas in the pair. The heatmap for one antenna can be derived from the heatmap from the other antenna in the pair. This results in "2-times" fewer heatmaps to be calculated and stored.

As an example, consider two antennas i and j which are the same distance from (0,0,height) and are 180 degrees apart. Assume that heatmap_i_diff is computed (as described above) and heatmap_j at bin [m,n] is needed. The way to derive heatmap_j from heatmap_i_diff is as follows:

$$\text{heat\_j\_reconst}[m,n] = \text{heatmap0}[m,n] - \text{double}(\text{heatmap\_i\_diff}[400-m, 400-n])/10^4 \text{ (assuming 401×401 heatmap and 0 index representing the first bin)}$$

Figure 4:
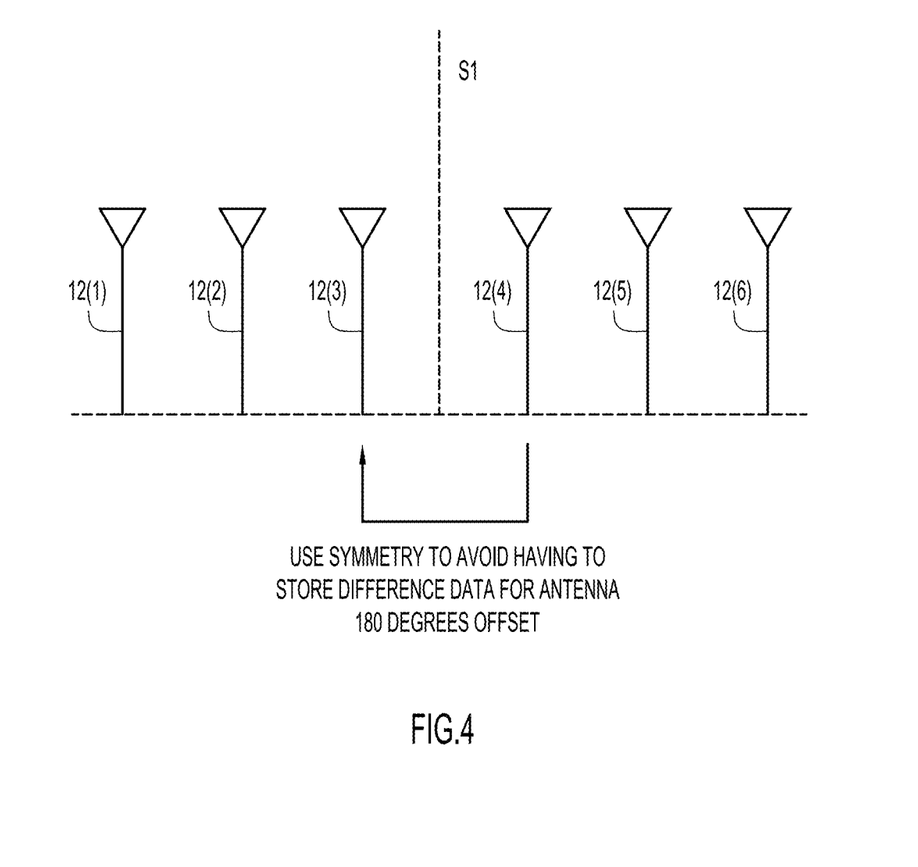
FIG. 4 is a diagram depicting a linear array of antennas having a single axis of symmetry that can be exploited to further reduce the amount of heatmap data stored, according to an example embodiment.

This can be done for a linear array of antennas, in which case the angle will always be 180 degrees, but the antenna pair is chosen for antennas that are equidistant from the center of the linear array. FIG. 4 shows a linear arrangement of antennas 12(1)-12(6). In this example, there is an axis of symmetry shown at S1. Thus, the heatmap difference data may only need to be computed for antennas 12(1), 12(2) and 12(3), from which the heatmap difference data for antennas 12(4), 12(5) and 12(6), respectively, may be derived.

Figure 5:
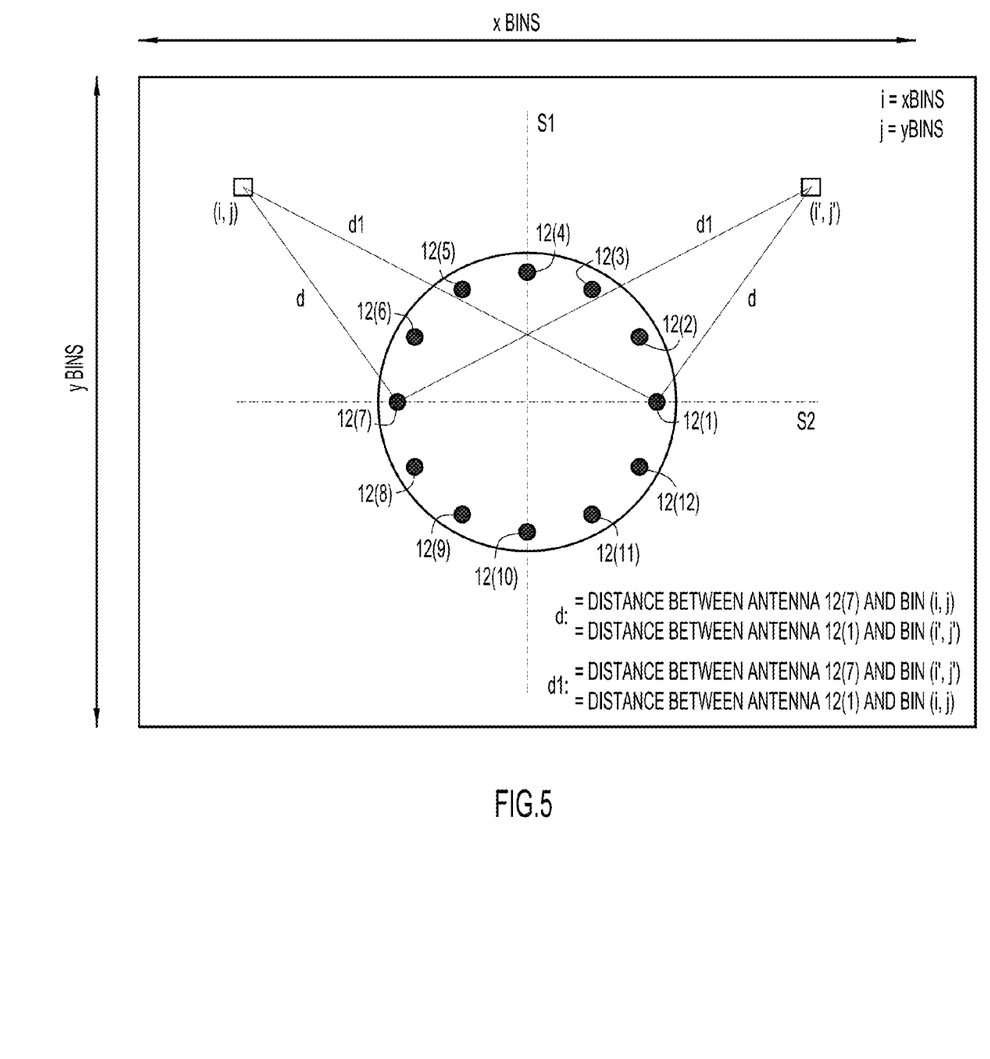
FIG. 5 is a diagram of a circular array of antennas having two axes of symmetry that can be exploited to even further reduce the amount of heatmap data stored, according to an example embodiment.

Reference is now made to FIG. 5 to illustrate symmetry for a circular antenna arrangement. In this example, there are 12 antennas 12(1)-12(12). Antennas 12(1) and 12(7) are used an example. Due to the symmetry with respect to axis of symmetry S1, the distance d between antenna 12(7) and bin(i,j) is equal to the distance between antenna 12(1) and bin(i',j'), where i'=xBins−i, and j'=yBins−j. Similarly, the distance d1 between antenna 12(7) and bin(i',j') is equal to the distance between antenna 12(1) and bin(i,j). Therefore, if the heatmap (or heatmap difference with respect to the centroid) is known for antenna 12(1), the heatmap for antenna 12(7) is the heatmap for antenna 12(1) flipped with respect to the y-axis. Thus, for any (i,j), the heatmap for antenna 12(7) is equal to the heatmap for antenna 12(1) at (i',j').

To generalize, when the plurality of antennas are physically arranged such that there is symmetry among the plurality of antennas with respect to at least one axis of symmetry, the heatmap difference data (with respect to the centroid) needs to be computed only for one or more antennas on a first side of the axis of symmetry, from which the difference can be derived for one or more antennas on a second side of the axis of symmetry. Said another way, from the heatmap difference data (with respect to the centroid) for one or more antennas on a first side of the axis of symmetry, the heatmap data for those one or more antennas can derived, and from the heatmap data for the one or more antennas on the first side of the axis of symmetry the heatmap data can be computed for one or more antennas on the second side of the axis of symmetry.

Furthermore, for a circular antenna arrangement, even more symmetry exists and this can easily be extended to antennas that are 90 degrees, and 270 degrees apart. For example, as shown in FIG. 5, there is another axis of symmetry shown at S2. Thus, to further generalize, when the plurality of antennas are physically arranged such that there is symmetry among the plurality of antennas with respect to multiple axes of symmetry, the heatmap difference data (with respect to the centroid) needs to be computed only for one or more antennas in one sub-region (e.g., quadrant) with respect to multiple axes of symmetry, from which the heatmap difference data can be derived for one or more antennas in other sub-regions (e.g., quadrants) with respect to the multiple axes of symmetry. That is, from the heatmap difference data (with respect to the centroid) for one or more antennas in a first region with respect to the multiple axes of symmetry, the heatmap data for those one or more antennas can derived, and from the heatmap data for the one or more antennas in the first sub-region with respect to the multiple the axes of symmetry the heatmap data can be computed for one or more antennas in other sub-regions with respect to the multiple axes of symmetry.

Using the center of the access point (or centroid in general) helps to obtain a minimum error when converting to short int to store the heatmap. If one of the antenna's heatmap is used as heatmap0, it will result in loss of precision when converting to short int due to increase in the max value of heatmap_i_diff.

The following illustrates the memory savings. As an example, with a 801×801 heatmap size and 32 antennas, the memory footprint of modified heatmap data (generated as described herein) can be 15% of the current AoA heatmaps that is currently needed for storage.

currHeatmapBytes=801*801*32*8. All 32 antenna stored as double for each value.

modHeatmapBytes=801*801*(1*8+(32/2)*2). One (1) heatmap stored as double and 16 heatmaps stored as difference data in, for example, int16 format. The memory savings is (1−modHeatmapBytes/currHeatmapBytes)*100~84.3%.

Figure 6:
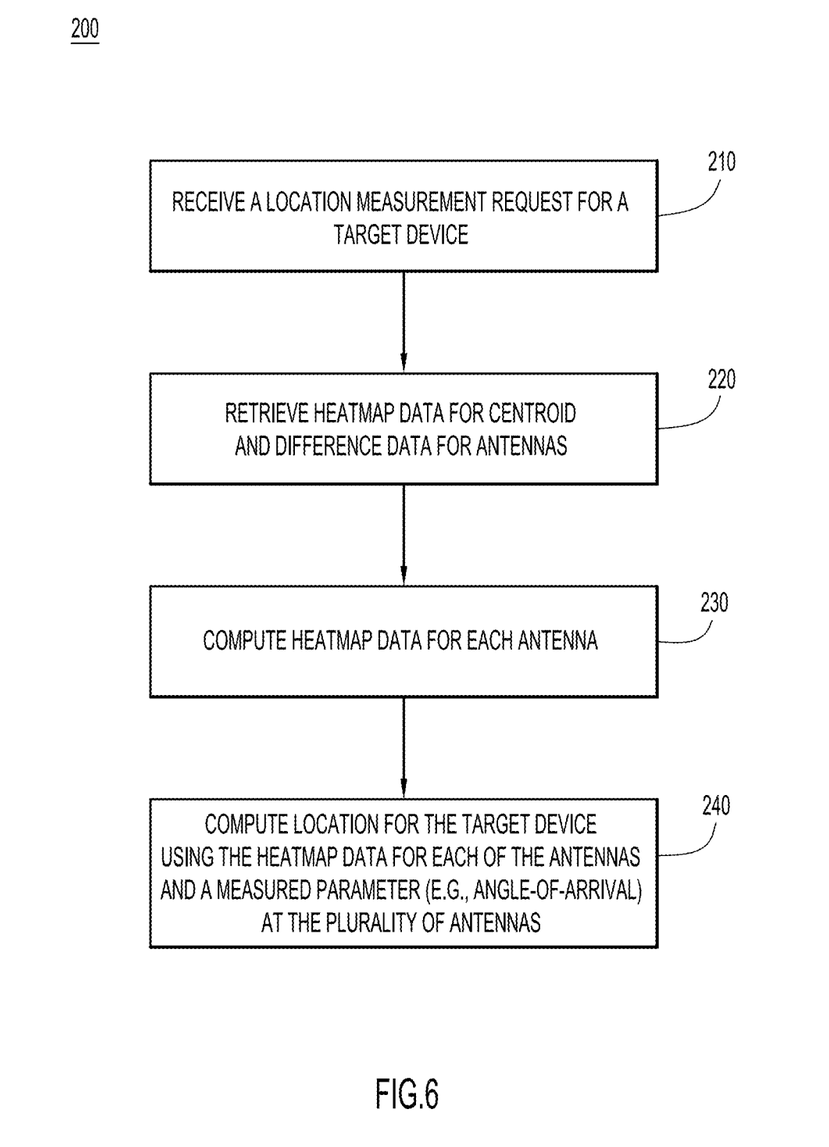
FIG. 6 is a flow chart of a method for using the heatmap data generated and stored according to the method of FIG. 3, according to an example embodiment.

Reference is now made to FIG. 6. FIG. 6 illustrates a flow chart for a method 200 that depicts an example of how the reduced amount of stored data, achieved by method 100 shown in FIG. 3, is used. Reference is also made to FIG. 1 for purposes of the description of FIG. 6. At 210, a location measurement request is received to determine the location of a target device. This request may arrive at the server 30. At 220, the heatmap data (for a measured parameter) for the centroid and the difference data for the antennas is retrieved from memory (or cache). At 230, the heatmap data is computed for each antenna from the heatmap data for the centroid and the difference data. At 240, a location of the target device is computed using the heatmap data for each of the plurality of antennas and the measured parameter at the plurality of antennas. It should be understood that usually there are multiple access points involved in a location procedure and thus the method 200 is performed for each of a plurality of access points. Moreover, the method 200 may performed at each of the access points 10, at the server 30 or at a hybrid-combination of operations performed at the access points 10 and at the server 30.

Figure 7:
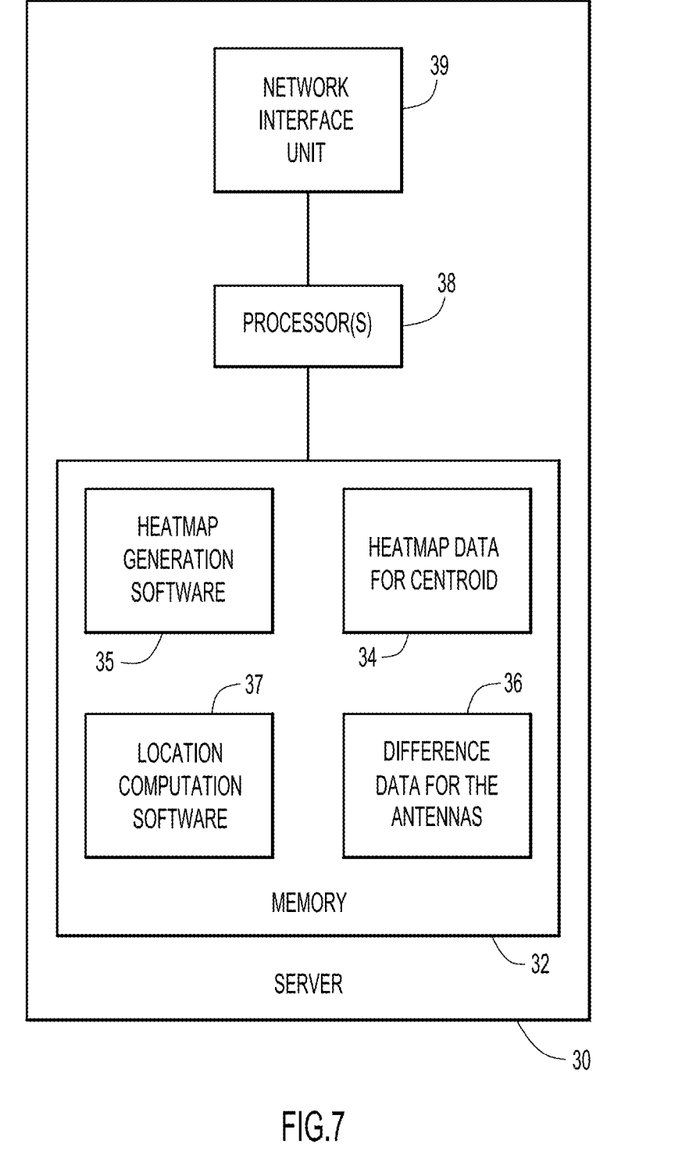
FIG. 7 is a block diagram of a computing apparatus (e.g., server) configured to generate, store and use the reduced heatmap data, according to an example embodiment.

FIG. 7 illustrates a block diagram of server 30. As described above in connection with FIG. 1, the server has a memory 32 that stores, for each access point that is under its management, heatmap data for the centroid at 34 and difference data for the antennas at 36. The memory 32 also stores instructions for heatmap generation software 35 and location computation software 37. The server 30 further includes a processor 38 (or multiple processors) and a network interface unit 39. The processor 38 may be a microprocessor or microcontroller, for example. The network interface unit 39 enables network communication on behalf of the server 30 so that the server 30 can communicate with the access points, as depicted in FIG. 1.

The memory 32 may be read only memory (ROM), random access memory (RAM), magnetic disk storage media devices, optical storage media devices, flash memory devices, electrical, optical, or other physical/tangible memory storage devices. Thus, in general, the memory 32 may comprise one or more tangible (non-transitory) computer readable storage media (e.g., a memory device) encoded with software comprising computer executable instructions and when the software is executed (by the processor 38) it is operable to perform the operations described herein. In particular, the server 30 performs the operations described above in connection with FIGS. 1-5 when executing the heatmap generation software 35. The server 30 performs the operations described above in connection with FIG. 6 when executing the location computation software 37.

Figure 8:
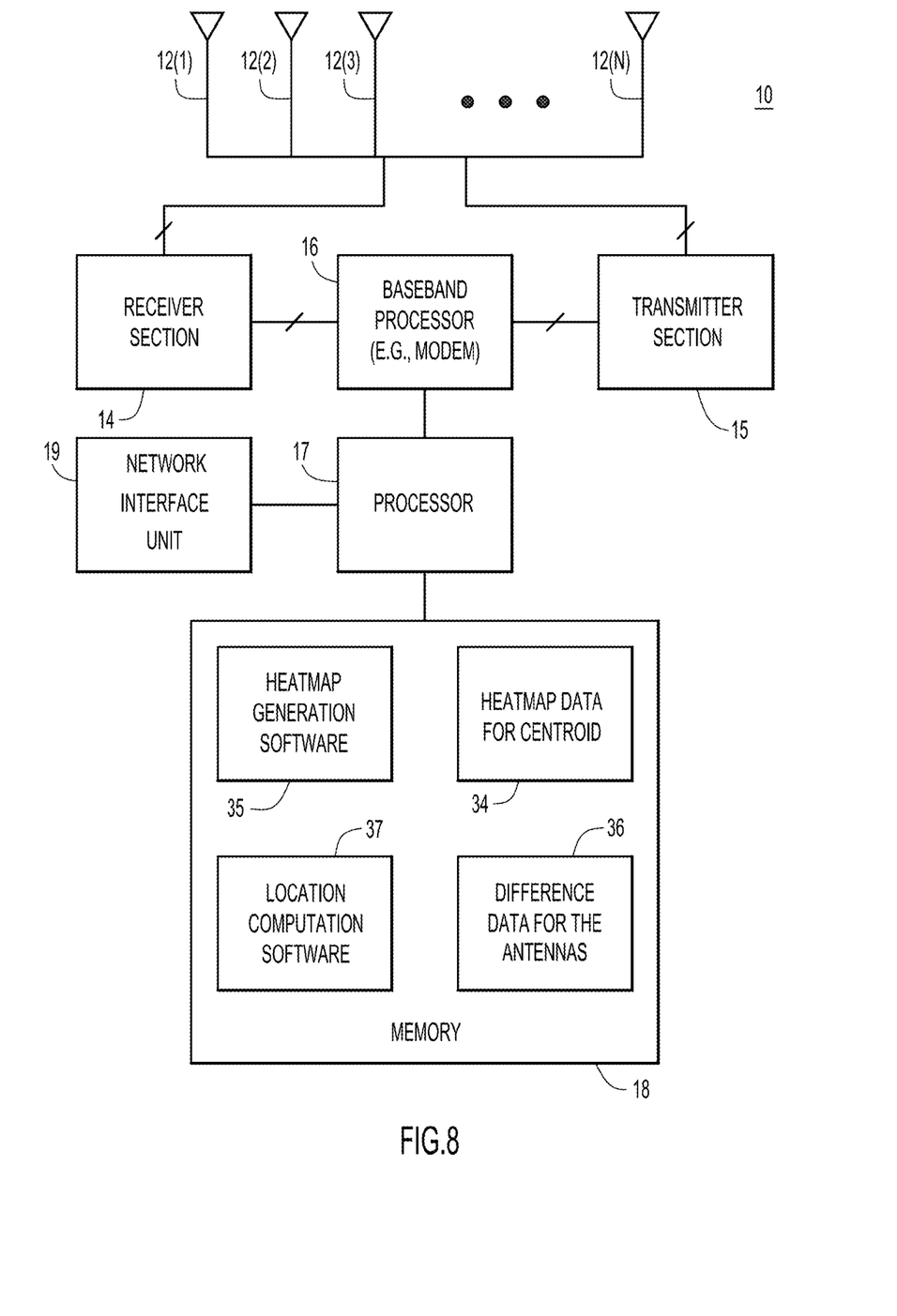
FIG. 8 is a block diagram of an access point configured to generate, store and use the reduced heatmap data, according to an example embodiment.

Reference is now made to FIG. 8. FIG. 8 illustrates a block diagram of a wireless access point 10 configured to generate and store heatmap data, as well as use the heatmap data. The access point 10 includes the plurality of antennas 12(1)-12(N), a receiver section 15 connected to the plurality of antennas 12(1)-12(N), a transmitter section 15 connected to the plurality of antennas 12(1)-12(N), a baseband processor (e.g., modem), a processor 17 and memory 18. The receiver section 14 includes a plurality of receivers, one for each of the antennas 12(1)-12(N). Likewise, the transmitter section 15 may include a plurality of transmitters, one for each of the antennas 12(1)-12(N). The receiver section 14 generates baseband receive signals which are supplied to the baseband processor 16. The baseband processor 16 performs baseband processing of the baseband receive signals and supplies recovered signals to the processor 17. One function of the baseband processor 16 may be to supply a measured parameter for a signal received (e.g., from a target device) at each of the antennas 12(1)-12(N), such as receive signal strength, etc., from which the baseband processor 16 (or processor 17) can generate Angle-of-Arrival data, etc. The processor 17 performs a variety of control functions, and in so doing, executes software stored in memory 18 using data received from the baseband processor 16 based on received signals. There is also a network interface unit 19 to enable (wired) network communications on behalf of the wireless access point 10.

The memory 18 stores software that is executed by the processor 17, including the heatmap generation software 35 and the location computation software 37, as well as the heatmap data 34 and difference data 35. Thus, the processor 17 of the access point may execute the heatmap generation software 35 to store heatmap data 34 for the centroid of the antennas 12(1)-12(N) and difference data 36 for the antennas, as described above in connection with FIGS. 1-5. Likewise, the processor may execute the location computation software 37 to generate a location estimate based on signals received at the plurality of antennas 12(1)-12(N) from a target device and based on the heatmap data 34 and difference data 36.

In summary, the techniques presented herein optimize storage of heatmap data with limited processing penalty, by using a centroid of the antenna distribution to compute an extensive heatmap and only storing a difference of the other antenna heatmaps with respect to centroid heatmap. Furthermore, the symmetric placement of the antennas can exploited to further decrease the number of difference heatmaps to be stored.

In one form, a method is provided that involves, for a wireless communication device having a plurality of antennas, determining a centroid of the plurality of antennas; computing for the centroid a heatmap for a measured parameter across a plurality of bins at coordinates within a region of interest; storing heatmap data for the centroid in memory; for a given one of the plurality of antennas, computing a difference between a heatmap for the given antenna and the heatmap for the centroid; and storing in the memory difference data representing the difference for the given antenna.

In another form, one or more non-transitory computer readable storage media are provided encoded with software comprising computer executable instructions and when the software is executed operable to: for a wireless communication device having a plurality of antennas, compute for a centroid of the plurality of antennas, a heatmap for a measured parameter across a plurality of bins at coordinates within a region of interest; store in memory heatmap data for the centroid in memory; for a given one of the plurality of antennas, compute a difference between a heatmap for the given antenna and the heatmap for the centroid; and store in the memory difference data representing the difference for the given antenna.

In still another form, an apparatus is provided comprising: a network interface unit configured to enable communications over a network; a memory; and a processor coupled to the network interface unit and the memory, wherein the processor is configured to: compute for a centroid of a plurality of antennas of a wireless communication device, a heatmap for a measured parameter across a plurality of bins at coordinates within a region of interest; store the data for the heatmap in the memory; for a given one of the plurality of antennas, compute a difference between a heatmap for the given antenna and the heatmap for the centroid; and store in the memory difference data representing the difference for the given antenna.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   for a wireless communication device having a plurality of antennas, determining a centroid of the plurality of antennas;
   computing for the centroid a heatmap for a measured parameter across a plurality of bins at coordinates within a region of interest;
   storing heatmap data for the centroid in memory;
   for a given one of the plurality of antennas, computing a difference between a heatmap for the given antenna and the heatmap for the centroid; and
   storing in the memory difference data representing the difference for the given antenna.

2. The method of claim 1, further comprising:
   receiving a location measurement request for a target device;
   retrieving from the memory the heatmap data for the centroid and the difference data for antennas;
   computing heatmap data for each of antennas from the heatmap data for the centroid and the difference data for the antennas; and
   computing a location of the target device using the heatmap data for each of the antennas and the measured parameter at the plurality of antennas.

3. The method of claim 1, wherein the measured parameter is an angle-of-arrival with respect to a signal transmitted by the target device and received at the plurality of antennas.

4. The method of claim 1, wherein the plurality of antennas are physically arranged such that there is symmetry among the plurality of antennas with respect to at least one axis of symmetry, and wherein computing the difference comprises computing the difference only for one or more antennas on a first side of the axis of symmetry, from which the difference is derived for one or more antennas on a second side of the axis of symmetry.

5. The method of claim 4, wherein the plurality of antennas are physically arranged such that there is symmetry among the plurality of antennas with respect to multiple axes of symmetry, and wherein computing the difference comprises computing the difference only for one or more antennas in one sub-region with respect to multiple axes of symmetry, from which the difference is derived for one or more antennas in all other sub-regions with respect to the multiple axes of symmetry.

6. The method of claim 4, wherein the plurality of antennas are arranged in a linear array.

7. The method of claim 4, wherein the plurality of antennas are arranged in a circular array.

8. One or more non-transitory computer readable storage media encoded with software comprising computer executable instructions and when the software is executed operable to:
   for a wireless communication device having a plurality of antennas, compute for a centroid of the plurality of antennas, a heatmap for a measured parameter across a plurality of bins at coordinates within a region of interest;
   store in memory heatmap data for the centroid in memory;
   for a given one of the plurality of antennas, compute a difference between a heatmap for the given antenna and the heatmap for the centroid; and
   store in the memory difference data representing the difference for the given antenna.

9. The non-transitory computer readable storage media of claim 8, further comprising instructions operable to:
   receive a location measurement request for a target device;
   retrieve from the memory the heatmap data for the centroid and the difference data for antennas;
   compute heatmap data for each of antennas from the heatmap data for the centroid and the difference data for the antennas; and
   compute a location of the target device using the heatmap data for each of the antennas and the measured parameter at the plurality of antennas.

10. The non-transitory computer readable storage media of claim 8, wherein the measured parameter is an angle-of-arrival with respect to a signal transmitted by the target device and received at the plurality of antennas.

11. The non-transitory computer readable storage media of claim 8, wherein the plurality of antennas are physically arranged such that there is symmetry among the plurality of antennas with respect to at least one axis of symmetry, and wherein the instructions operable to compute the difference comprise instructions operable to compute the difference only for one or more antennas on a first side of the axis of symmetry, from which the difference is derived for one or more antennas on a second side of the axis of symmetry.

12. The non-transitory computer readable storage media of claim 8, wherein the plurality of antennas are physically arranged such that there is symmetry among the plurality of antennas with respect to multiple axes of symmetry, and wherein the instructions operable to compute the difference comprise instructions operable to compute the difference only for one or more antennas in one sub-region with respect to multiple axes of symmetry, from which the difference is derived for one or more antennas in all other sub-regions with respect to the multiple axes of symmetry.

13. The non-transitory computer readable storage media of claim 8, wherein the plurality of antennas are arranged in a linear array.

14. The non-transitory computer readable storage media of claim 8, wherein the plurality of antennas are arranged in a circular array.

15. An apparatus comprising:
   a network interface unit configured to enable communications over a network;
   a memory; and
   a processor coupled to the network interface unit and the memory, wherein the processor is configured to:
      compute for a centroid of a plurality of antennas of a wireless communication device, a heatmap for a measured parameter across a plurality of bins at coordinates within a region of interest;
      store the data for the heatmap in the memory;
      for a given one of the plurality of antennas, compute a difference between a heatmap for the given antenna and the heatmap for the centroid; and
      store in the memory difference data representing the difference for the given antenna.

16. The apparatus of claim 15, wherein the processor is configured:
   receive a location measurement request for a target device;
   retrieve from the memory heatmap data for the centroid and the difference data for antennas;
   compute heatmap data for each of antennas from the heatmap data for the centroid and the difference data for the antennas; and
   compute a location of the target device using the heatmap data for each of the antennas and the measured parameter at the plurality of antennas.

17. The apparatus of claim 15, wherein the measured parameter is an angle-of-arrival with respect to a signal transmitted by the target device and received at the plurality of antennas.

18. The apparatus of claim 15, wherein the plurality of antennas are physically arranged such that there is symmetry among the plurality of antennas with respect to at least one axis of symmetry, and wherein the processor is configured to compute the difference only for one or more antennas on a first side of the axis of symmetry, from which the difference is derived for one or more antennas on a second side of the axis of symmetry.

19. The apparatus of claim 15, wherein the plurality of antennas are physically arranged such that there is symmetry among the plurality of antennas with respect to multiple axes of symmetry, and wherein the processor is configured to compute the difference only for one or more antennas in one sub-region with respect to multiple axes of symmetry, from which the difference is derived for one or more antennas in all other sub-regions with respect to the multiple axes of symmetry.

20. The apparatus of claim 15, wherein the plurality of antennas are arranged in either a linear array or a circular array.

* * * * *